Dec. 27, 1955    W. FERRIS    2,728,302
REDUCTION OF SHOCKS AND NOISE IN POWER PUMPS
Filed April 5, 1951    8 Sheets—Sheet 1

INVENTOR.
WALTER FERRIS
BY
Wesley P. Merrill
ATTORNEY

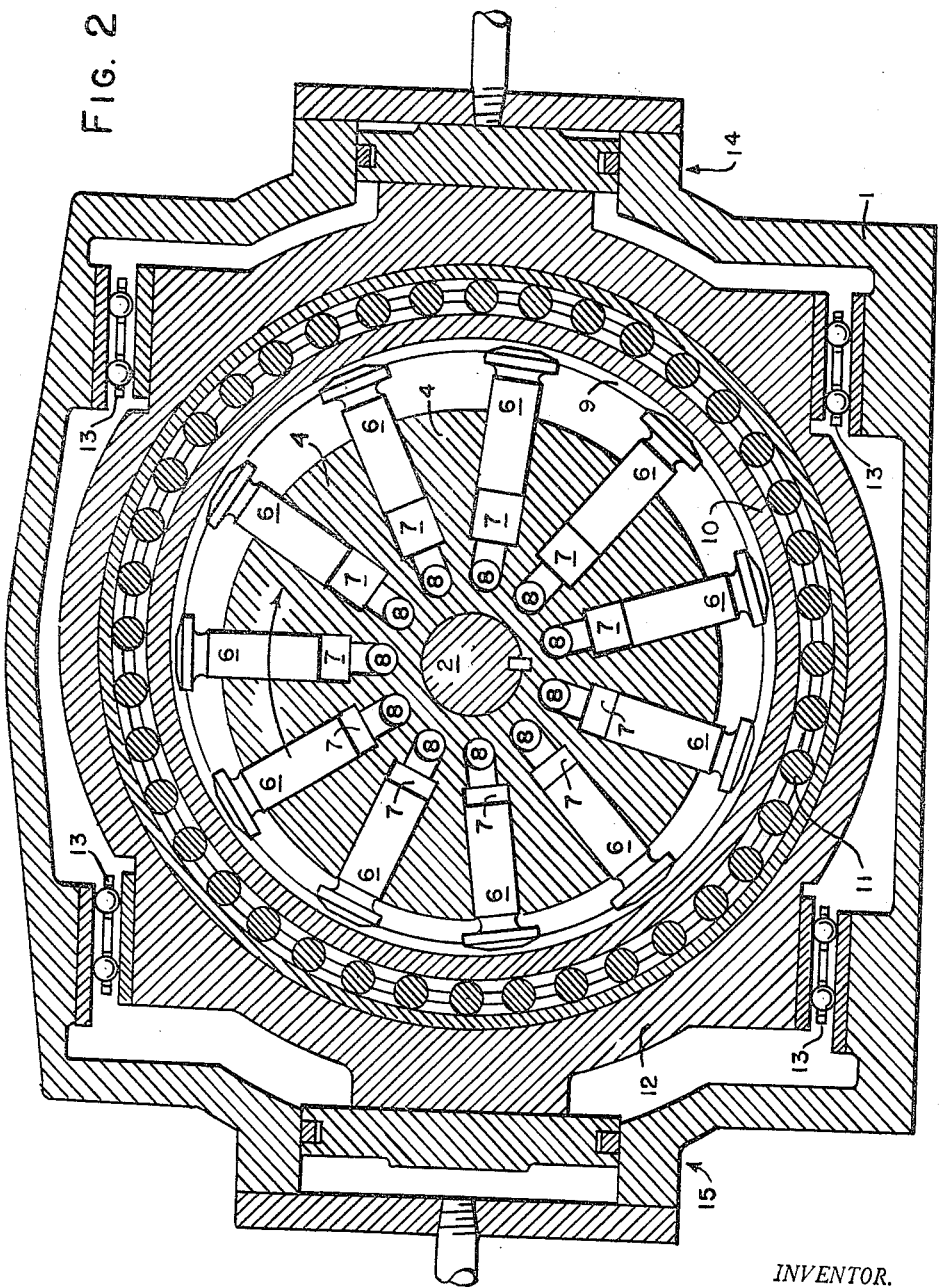

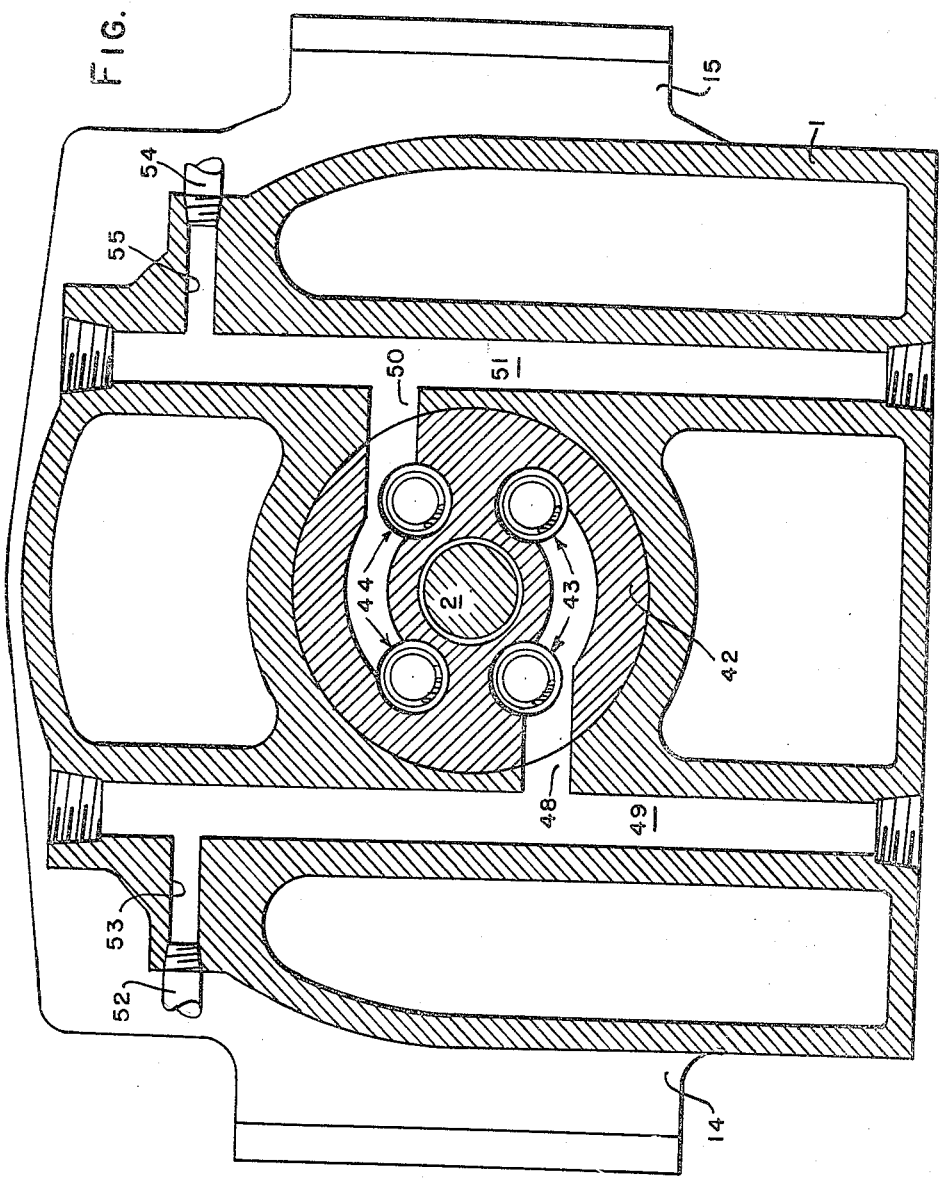

Dec. 27, 1955  W. FERRIS  2,728,302
REDUCTION OF SHOCKS AND NOISE IN POWER PUMPS
Filed April 5, 1951  8 Sheets-Sheet 4
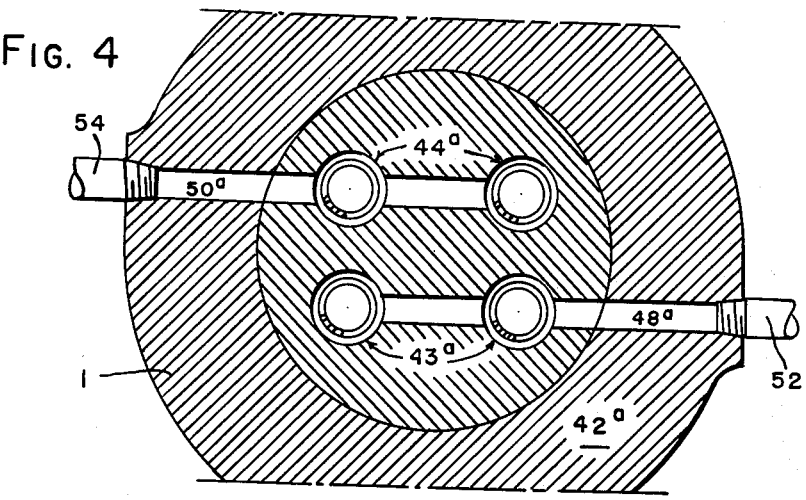
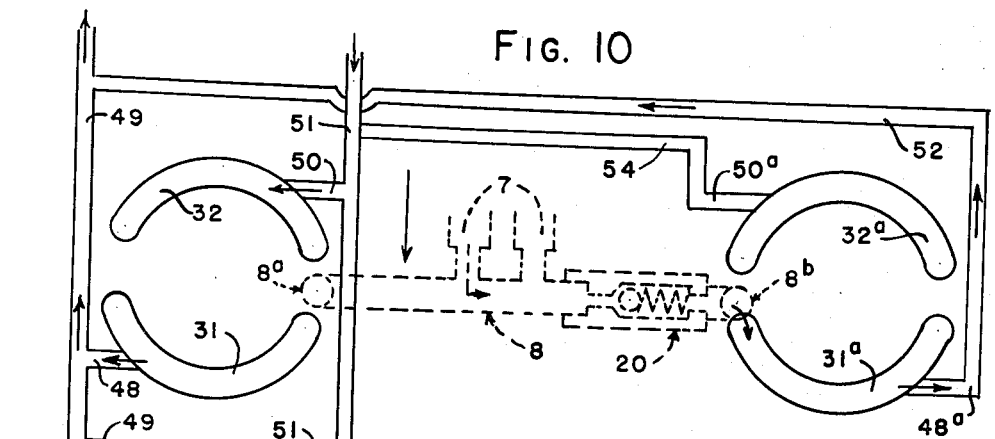
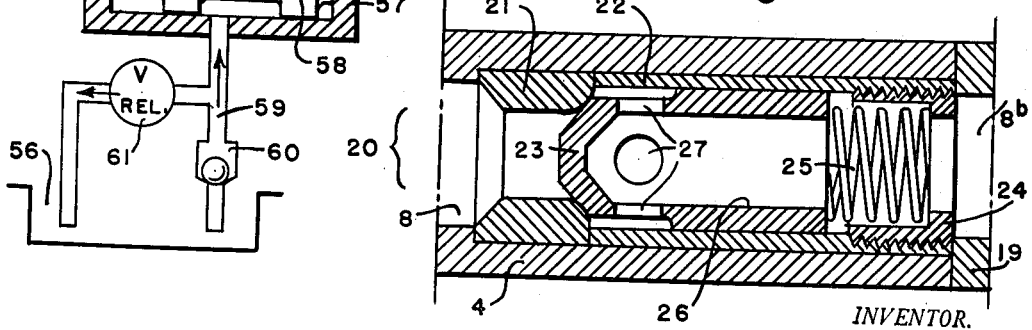
INVENTOR.
WALTER FERRIS
BY
*Wesley P. Merrill*
ATTORNEY Dec. 27, 1955            W. FERRIS            2,728,302

REDUCTION OF SHOCKS AND NOISE IN POWER PUMPS

Filed April 5, 1951            8 Sheets-Sheet 5

*INVENTOR.*
WALTER FERRIS
BY
*Wesley P. Merrill*
ATTORNEY

Dec. 27, 1955
W. FERRIS
2,728,302
REDUCTION OF SHOCKS AND NOISE IN POWER PUMPS
Filed April 5, 1951
8 Sheets-Sheet 6
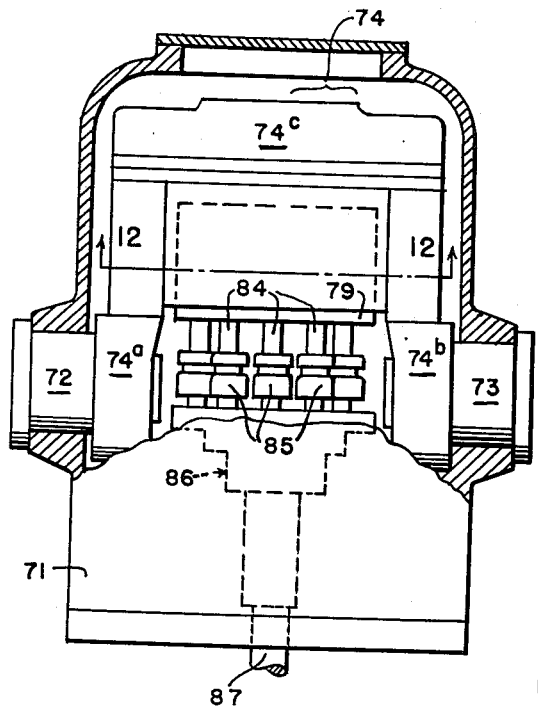
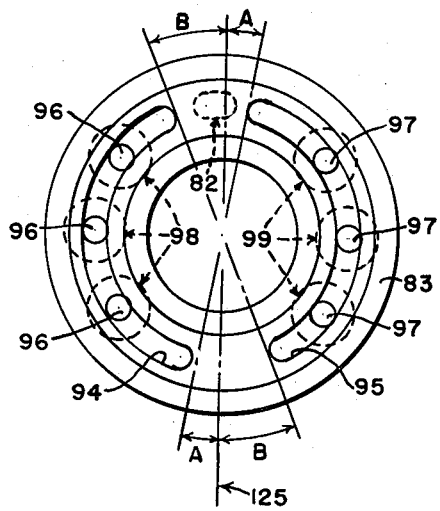
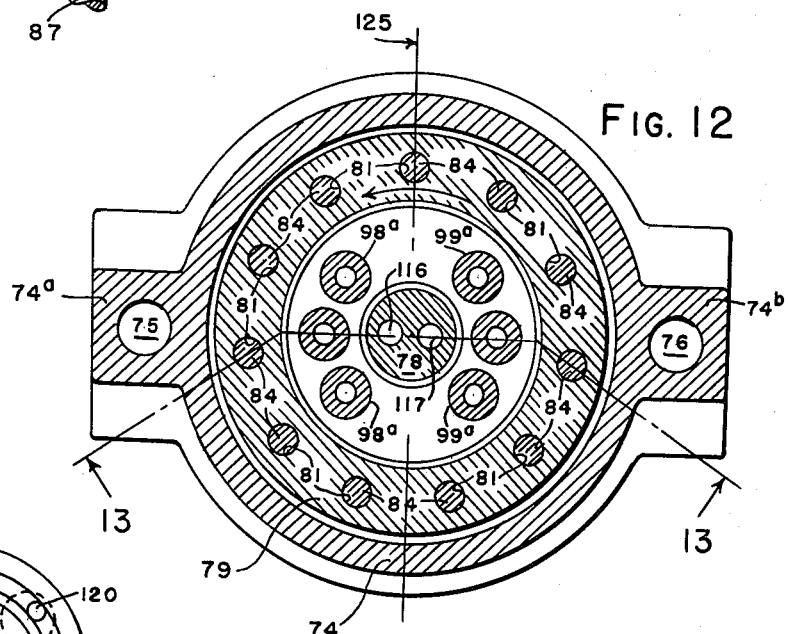
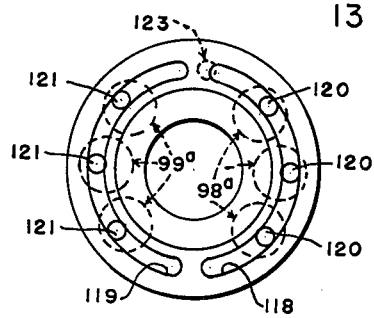
INVENTOR.
WALTER FERRIS
BY
*Wesley P. Merrill*
ATTORNEY

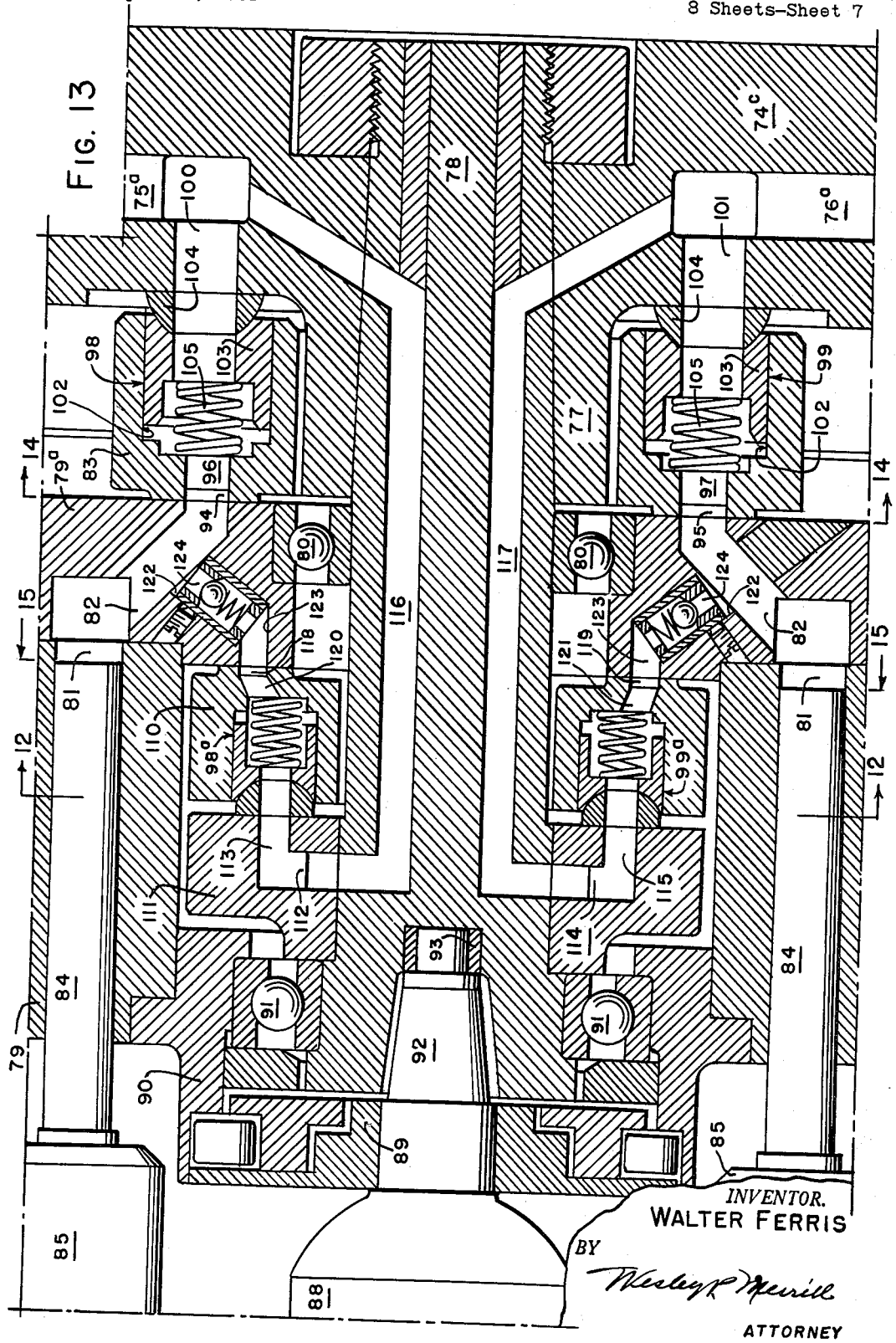

Dec. 27, 1955   W. FERRIS   2,728,302
REDUCTION OF SHOCKS AND NOISE IN POWER PUMPS
Filed April 5, 1951   8 Sheets-Sheet 8

INVENTOR.
WALTER FERRIS
BY
ATTORNEY

United States Patent Office 2,728,302
Patented Dec. 27, 1955

2,728,302

REDUCTION OF SHOCKS AND NOISE IN POWER PUMPS

Walter Ferris, Milwaukee, Wis., assignor to The Oilgear Company, Milwaukee, Wis., a corporation of Wisconsin Application April 5, 1951, Serial No. 219,355

18 Claims. (Cl. 103—161)

This invention relates to pumps of the expansible chamber type which are employed to pump liquid at pressures high enough to perform useful work and which are provided with means for reducing the shocks and the noise resulting from the high pressure, such as the pump shown in Patent No. 2,661,695.

A pump of this type includes at least one intake port for connection to a supply of liquid, at least one discharge port which is spaced from the intake port and is adapted to be connected to an external circuit, a plurality of pump chambers each of which registers with an intake port and a discharge port alternately during operation of the pump, and means to increase the capacity of each chamber while it is in registry with the intake port and to decrease the capacity of each chamber while it is in registry with the discharge port to thereby cause liquid to flow from the intake port into each chamber in registry therewith and liquid to be expelled into the discharge port from each chamber in registry therewith.

When the liquid discharged by the pump is required to do useful work such as energizing a motor, the liquid expelled from the chambers into the discharge port causes pressure to rise therein but the liquid in the chambers which are not in registry with the discharge port is under a low or negative pressure and very often it contains entrained gas. Consequently, when a chamber opens to the discharge port, the pressure in the discharge port causes the liquid to rush therefrom into that chamber and compress the liquid and entrained gas therein until the pressure in that chamber is the same as the pressure in the discharge port. This sudden backflow of liquid from the discharge port into the chamber causes a shock and a resultant noise and, if the pump is creating a high pressure, the shocks and noise are of considerable magnitude.

The present invention has as an object to reduce the shocks and noise inherent in pumps of this type.

Another object is to prevent any shock or noise due to backflow of liquid from the discharge port into the pumping chambers.

A pump embodying the invention has the advantage that it will operate more quietly than a prior pump of the same type and with increased efficiency.

In certain types of pumps, cylinders are arranged in a rotatable cylinder barrel having a flat valve seat upon an end thereof, a flat faced valve engages the valve seat and is provided with at least one intake port and at least one discharge port, and each cylinder communicates with an intake port and with a discharge port alternately during rotation of the cylinder barrel. When the pump creates pressure, the pressure in the discharge port and in the lubricating film between the valve and the valve seat exerts upon the valve seat a force which tends to move the cylinder barrel away from the valve.

Another object of the present invention is to provide a pump with means which will prevent shocks and noise due to backflow of liquid from the discharge port into the pumping chamber and will also cause a force to be exerted upon the cylinder barrel in opposition to the force which tends to move the cylinder barrel away from the valve.

Other objects and advantages will appear from the description hereinafter given of pumps to which the invention has been applied.

According to the invention in its principal aspect, the fluid in each pumping chamber is compressed to a pressure at least as great as the pressure in the discharge port before that chamber opens to the discharge port.

According to the invention in another aspect, a pump has a main valve in engagement with an end of the rotor or block which contains the pumping chambers, the main valve has intake and discharge ports formed therein for the main flow of liquid to and from the chambers, an auxiliary valve engages the rotor or block in opposition to the main valve and is provided with an auxiliary discharge port which is connected to the discharge port in the main valve, each chamber is adapted to communicate with the auxiliary discharge port through a check valve, and the main discharge port is so located that each chamber can communicate therewith only after the chamber has been contracted a predetermined amount so that any liquid expelled from a chamber during the first part of contraction thereof must be expelled through a check valve into the auxiliary discharge port at which time the check valve is urged toward its closed position by the pressure in the discharge ports.

For the purpose of illustration, the invention will be explained as applied to radial type piston pumps and to an axial pump of the angle type but the invention is not limited to those particular types of pumps.

The invention is exemplified by the pumps illustrated in the accompanying drawings in which the views are as follows:

Fig. 2 is a transverse section taken on the line 2—2 of Fig. 1.

Fig. 3 is a transverse section taken on the line 3—3 of Fig. 1.

Fig. 4 is a transverse section taken on the line 4—4 of Fig. 1.

Fig. 9 is a longitudinal section through a check valve which controls the flow of liquid from a pumping cylinder into the auxiliary valve, the view being taken in the same plane as Fig. 1 but drawn to a larger scale.

Fig. 10 is a diagram of the hydraulic circuit of the pump.

Fig. 11 is a top plan view of an angle type axial pump to which the invention has been applied, a part of the pump casing being broken away to expose the cradle and the trunnions.

Fig. 12 is a transverse section taken on the line 12—12 of Fig. 11 but drawn to a larger scale, the plane of the view being indicated also by the line 12—12 of Fig. 13.

Fig. 13 is a longitudinal section taken on the irregular line 13—13 of Fig. 12 but drawn to a larger scale, certain parts being broken away or omitted in order to show the view on as large a scale as possible.

Fig. 14 is a face view of the main valve through which the greater part of the liquid flows to and from the pumping cylinders, the view being taken in the plane of line 14—14 of Fig. 13 but drawn to the same scale as Fig. 12.

Fig. 15 is a face view of an auxiliary valve through which liquid is discharged from each pumping cylinder during the first part of the instroke of the piston in that cylinder, the view being taken in the plane of line 15—15 of Fig. 13 but drawn to the same scale as Fig. 12.

*Figs. 1–10*

Figure 1:
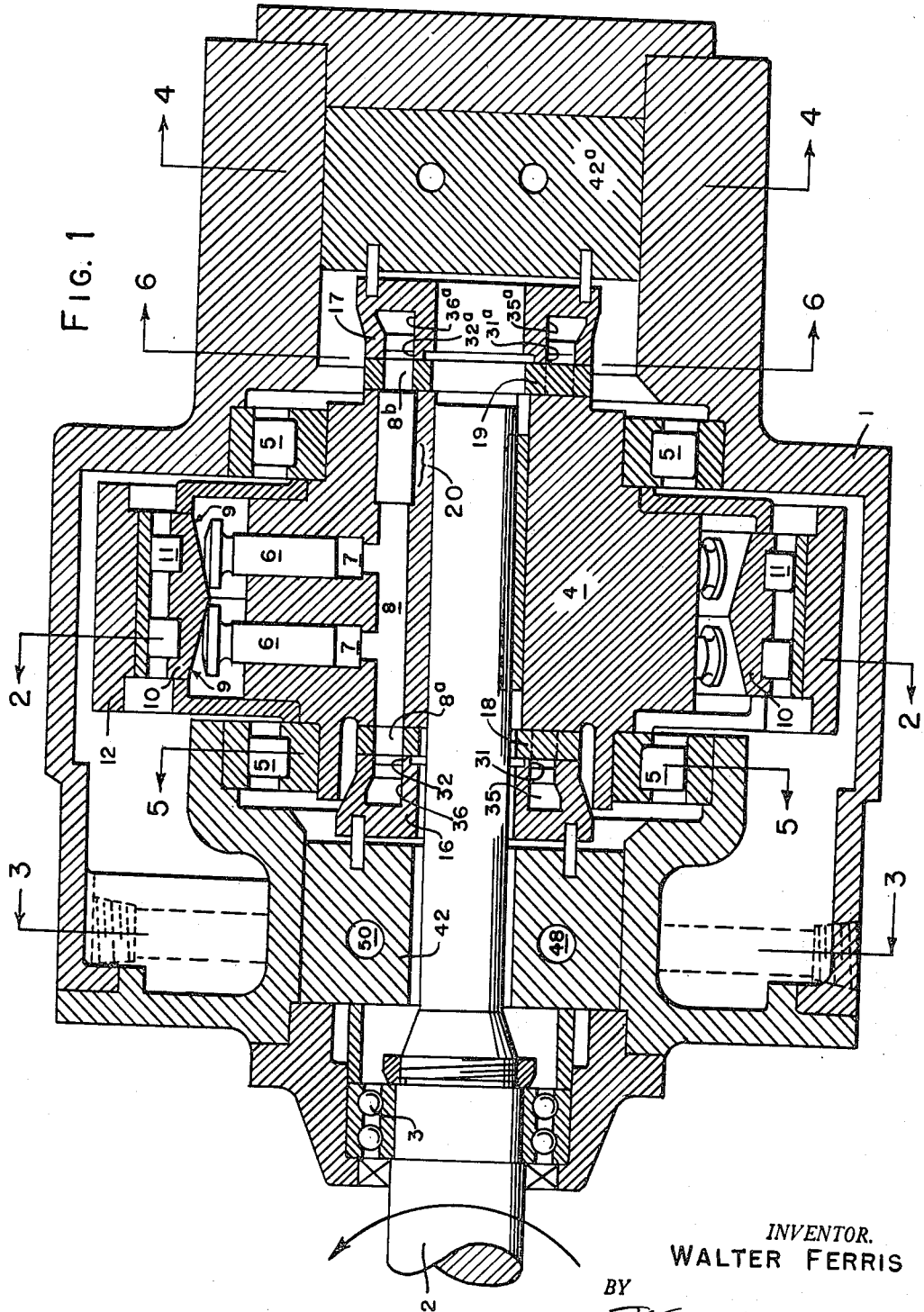
Fig. 1 is a longitudinal vertical section through a radial piston flat valve pump to which the invention has been applied.

The pump shown in these figures is of the type shown in Patent No. 2,484,337 to which reference may be had for details of construction. The mechanism of the pump is arranged within and carried by a casing 1 which consists of a plurality of parts and in practice has a plurality of passages formed therein but, in order to simplify the drawings, the casing has been simplified and some of the passages have been represented by external channels.

Power is transmitted to the pump through a drive shaft 2 which is journaled in a bearing 3 carried by casing 1. Shaft 2 has the inner portion thereof keyed to or otherwise fixed for rotation with a cylinder barrel 4 which is rotatably supported by two bearings 5 carried by casing 1. A piston 6 is fitted in each of a plurality of cylinders 7 which are formed radially in cylinder barrel 4 and are shown arranged in two circular rows with each cylinder in one row in axial alinement with a cylinder in the other row. Each two cylinders which are in axial alinement with each other communicate at the inner ends thereof with an axial passage 8 which extends completely through cylinder barrel 4.

The pistons in each row have the outer ends or heads thereof in contact with a conical reaction surface 9 formed upon the inside of an annular thrust member 10 which is rotatably supported by a roller bearing 11. In a constant displacement pump, thrust member 10 rotates upon a fixed axis but it has been shown supported by bearing 11 within a displacement varying member or slide block 12 which is slidably supported and restrained from vertical movement by four roller bearings 13 as shown in Fig. 2.

Slide block 12 has been shown in Fig. 2 as being shiftable in one direction by a servomotor 14 and in the opposite direction by a large servo-motor 15. Servo-motor 14 is constantly supplied with liquid at a constant pressure. When liquid is supplied to servo-motor 15 at the same pressure, it will move slide block 12 toward the right in respect to Fig. 2 and, when liquid is permitted to escape from servo-motor 15, servo-motor 14 will move slide block 12 toward the left.

When slide block 12 is in its central or neutral position, thrust member 10 is concentric with cylinder barrel 4 and pump displacement is zero. When slide block 12 is offset toward the right from its neutral position as shown in Fig. 2, thrust member 10 will be eccentric to cylinder barrel 4 and, during rotation of cylinder barrel 4 in the direction of the arrow, the pistons 6 below the horizontal centerline of cylinder barrel 4 will be forced progressively inward by thrust member 10 and the pistons 6 above the horizontal centerline of cylinder barrel 4 will be moved progressively outward by centrifugal force.

In other words, each piston will be forced progressively inward as it moves from a horizontal position at the right of Fig. 2 to a horizontal position at the left of Fig. 2 and then it will be moved progressively outward as it moves from a horizontal position at the left of Fig. 2 to a horizontal position at the right of Fig. 2. The horizontal centerline may thus be designated as "dead center position" for the reason that, when a piston is on the horizontal centerline, it is not moving either inward or outward.

The outward moving pistons will draw liquid into their cylinders from passages 8 and the inward moving pistons will expel liquid from their cylinders into passages 8. When slide block 12 is offset toward the left from its neutral position in respect to Fig. 2 and cylinder barrel 4 is rotated in a direction of the arrow, the pistons 6 above the horizontal centerline of cylinder barrel 4 will be forced progressively inward by a thrust member 10 and the pistons 6 below the horizontal centerline of cylinder barrel 4 will be moved progressively outward by centrifugal force.

While the pump has been shown as having two circular rows of cylinders, it may have only a single circular row of cylinders in which case only one cylinder would communicate with each passage 8, or it may have a larger number of circular rows of cylinders in which case all of the cylinders in or nearly in axial alinement with each other would communicate with the same passage 8. In fact, it is common practice to provide pumps of various volumetric capacities by varying the number of circular rows of cylinders in the various pumps.

A plurality of cylinders which are connected to each other, such as by means of a passage 8, are the equivalent of and function in the same manner as a single cylinder having a cross-sectional area equal to the sum of the cross-sectional areas of the plurality of cylinders. Therefore, the term "cylinder" as used herein is intended to mean either a single cylinder or a plurality of cylinders which are connected together, and the term "piston" as used herein is intended to mean either a single piston or a plurality of pistons fitted in cylinders which are connected to each other.

The flow of liquid to and from cylinders 7 is controlled by a non-rotatable main valve 16, which is arranged at the left end of cylinder barrel 4, and a non-rotatable auxiliary valve 17 which is arranged at the right end of cylinder barrel 4. Each of valves 16 and 17 has formed in the face thereof crescent shaped intake and discharge ports with which passages 8 communicate during rotation of rotor 4 as will presently be explained.

The faces of the valves and the ends of the cylinder barrel are made flat and smooth and the faces of the valves may engage the ends of the cylinder barrel but the pump has been shown as having two flat and smooth wear plates 18 and 19 arranged upon opposite ends of cylinder barrel 4 and fixed for rotation therewith. In practice, wear plates are also attached to the faces of the valves but they have not been shown in order to avoid complicating the drawings.

Wear plate 18 has formed therein a plurality of holes 8ᵃ which correspond to and register with the left ends of passages 8 and wear plate 19 has formed therein a plurality of holes 8ᵇ which correspond to and register with the right ends of passages 8. Holes 8ᵃ and 8ᵇ constitute cylinder ports which are adapted to register with the ports in the valves 16 and 17 during rotation of cylinder barrel 4.

The right end of each passage 8 is enlarged and there is inserted into the enlarged portion of each passage 8 a check valve 20 which permits liquid to flow from passage 8 into auxiliary valve 17 but prevents any flow from valve 17 into passage 8. For the purpose of illustration, check valve 20 has been shown in Fig. 9 as including an annular valve seat 21, which is closely fitted in the left end of the enlarged portion of a passage 8, a sleeve 22 which is closely fitted in the enlarged portion of passage 8 and engages seat 21 and wear plate 19 to hold seat 21 in position, a valve 23 which is slidably fitted within sleeve 22 and normally engages seat 21, an annular plug 24 which is threaded into the right end of sleeve 22, and a spring 25 arranged between valve 23 and plug 25 to urge valve 23 against seat 21. Valve 23 has a portion thereof adjacent seat 21 reduced in diameter and it has an axial bore 26 extending from its right end into communication with a plurality of holes 27 which extend through the wall of the reduced portion.

The arrangement is such that valve 23 is normally held against seat 21 by spring 25 and by any pressure in port 8$^b$ so that no liquid can flow from port 8$^b$ into passage 8 nor from passage 8 into port 8$^b$. But when the pressure in passage 8 exceeds the pressure in port 8$^b$ by an amount sufficient to overcome the resistance of spring 25, it will move valve 23 away from seat 21 and then liquid will flow from passage 8 through valve seat 21, holes 27, bore 26, the right hand portion of sleeve 22 and plug 24 into port 8$^b$ and thence into the discharge port of auxiliary valve 17 as will presently be explained.

Figure 5:
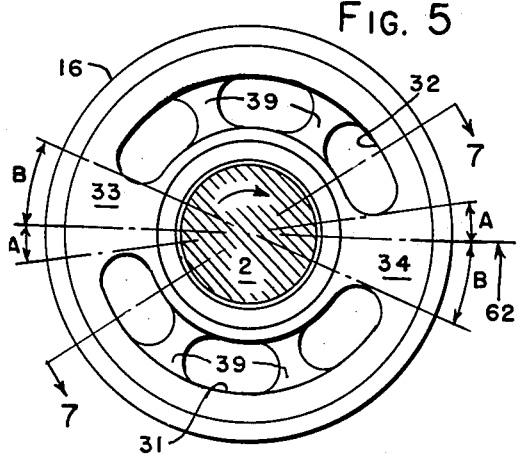
Fig. 5 is a face view of the main valve which controls the greater part of the flow of liquid to and from the pumping cylinders, the view being taken on the line 5—5 of Fig. 1 but drawn to a larger scale.

As best shown in Fig. 5, main valve 16 has formed in the inner end or face thereof two diametrically opposed substantially crescent shaped ports 31 and 32 with which each cylinder port 8$^a$ communicates alternately during rotation of cylinder barrel 4. The adjacent ends of ports 31 and 32 are separated from each other by portions of the valve face which constitute liquid seals or bridges 33 and 34 to prevent a cylinder port 8$^a$ from communicating with both of valve ports 31 and 32 simultaneously.

Ports 31 and 32 communicate, respectively, with two chambers 35 and 36 (Figs. 7 and 8) which are formed in valve 16 and have passages 37 and 38 leading therefrom, respectively, through the outer end of the valve. In order to prevent the face of valve 16 from being distorted due to changes in temperature and pressure, a plurality of integral ties or struts 39 extend across each of ports 31 and 32 and are spaced from the face of the valve.

Movement of valve 16 away from wear plate 18 is prevented by two hold-up motors 40 and two hold-up motors 41 carried by a distributing block 42 which is rigidly secured within casing 1. Each hold-up motor 40 has its cylinder 43 formed in block 42 below and parallel to the centerline of valve 16 and each hold-up motor 41 has its cylinder 44 formed in block 42 above and parallel to that centerline. The four hold-up motors are identical and each has a tubular piston 45 fitted in its cylinder and urged by a spring 46 against an annular sealing member 47 which is urged by spring 46 against the outer end of valve 16.

The opening through the sealing member 47 of each motor 40 registers with the opening through piston 45 of that motor and with a passage 37 and the opening through the sealing member 47 of each motor 41 registers with the opening through the piston 45 of that motor and with a passage 38 so that the inner ends of the two cylinders 43 communicate freely with chamber 35 and port 31 in valve 16 and the inner ends of the two cylinders 44 communicate freely with the chamber 36 and port 32 in valve 16. The contacting surfaces of valve 16 and members 47 are made flat and smooth and the contacting surfaces of members 47 and pistons 45 are made spherical and smooth to provide self alining liquid tight seals between valve 16 and block 42.

The arrangement is such that valve 16 is urged against wear plate 18 by springs 46 and, when the pump is creating pressure, valve 16 is also urged against wear plate 18 by the pump pressure acting upon the inner ends of pistons 45.

The two cylinders 43 of hold-up motors 40 are connected by a passage 48 to each other and to a passage 49 (Fig. 3) which is formed in casing 1 and is adapted to be connected to one side of an external circuit. The two cylinders 44 of hold-up motors 41 are connected by a passage 50 to each other and to a passage 51 which is formed in casing 1 and is adapted to be connected to the other side of an external circuit. Since the pump is reversible, both of passages 49 and 51 are adapted to be connected to a source of liquid through a suction valve as presently will be explained.

With the exception of the angular length of the ports, auxiliary valve 17 is the same as main valve 16, it is restrained from movement away from wear plate 19 by four hold-up motors (not shown) which are arranged within a distributing block 42$^a$ and are identical to and arranged in the same relative position as hold-up motors 40 and 41, and distributing block 42$^a$ is similar to block 42 and is rigidly secured within the right hand portion of casing 1. Consequently, like parts have been indicated by like reference numerals with the exponent "a" added to the numerals applied to valve 17 and distributing block 42$^a$ and only so much of valve 17 and distributing block 42$^a$ has been shown as is necessary to an understanding of the operation of the pump.

Figure 6:
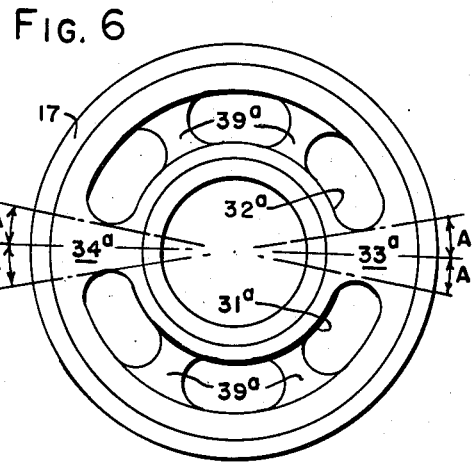
Fig. 6 is a face view of an auxiliary valve through which liquid is discharged from the pumping cylinders during the first part of the instroke of each piston, the view being taken on the line 6—6 of Fig. 1 but drawn to a larger scale.
Figure 8:
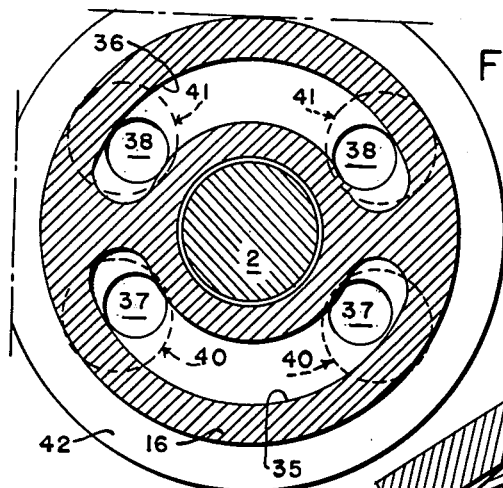
Fig. 8 is a section taken through the main valve on the line 8—8 of Fig. 7.

As best shown in Fig. 6, auxiliary valve 17 has formed in the inner end or face thereof two substantially crescent shaped ports 31$^a$ and 32$^a$ with which each cylinder port 8$^b$ communicates alternately during rotation of cylinder barrel 4. The adjacent ends of ports 31$^a$ and 32$^a$ are separated from each other by portions of the valve face which constitute liquid seals or bridges 33$^a$ and 34$^a$ to prevent a cylinder port 8$^b$ from communicating with both of valve ports 31$^a$ and 32$^a$ simultaneously. Valve 17 also has formed therein two chambers 35$^a$ and 36$^a$ (Fig. 1) which are directly behind ports 31$^a$ and 32$^a$, respectively, and communicate therewith.

Figure 7:
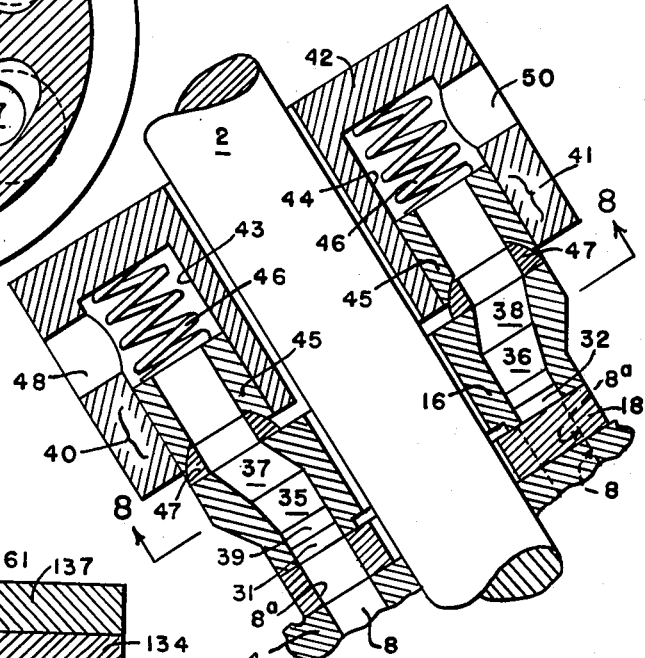
Fig. 7 is a sectional view of the main valve and parts adjacent thereto, the view being taken on the line 7—7 of Fig. 5.

As best shown in Fig. 4, distributing block 42$^a$ has two hold-up motor cylinders 43$^a$ formed therein below its horizontal centerline and two hold-up motor cylinders 44$^a$ formed therein above its horizontal centerline. Cylinders 43$^a$ and 44$^a$ constitute parts of hold-up motors (not otherwise shown) which are identical to hold-up motors 40 and 41 and function in the same manner. Chambers 35$^a$ and 36$^a$ in valve 17 communicate, respectively, with cylinders 43$^a$ and 44$^a$ in the same manner that chambers 35 and 36 in valve 16 communicate with cylinders 43 and 44 as shown in Fig. 7.

The two cylinders 43$^a$ have been shown connected by a passage 48$^a$ (Fig. 4) to each other and to one end of a pipe 52 the other end of which is connected to a passage 53 (Fig. 3) which communicates with passage 49, and the two cylinders 44$^a$ have been shown connected by a passage 50$^a$ (Fig. 4) to each other and to one end of a pipe 54 the other end of which is connected to a passage 55 (Fig. 3) which communicates with passage 51 but in practice passages 48$^a$ and 50$^a$ may be connected to passages 49 and 51, respectively, by passages formed in casing 1.

The upper ends of passages 49 and 51 are adapted to be connected to opposite sides of an external circuit. Since the pump is reversible, channels 49 and 51 have been shown in Fig. 10 as being adapted to be selectively supplied with liquid from a reservoir 56 through a valve casing 57 having a valve 58 fitted therein. Casing 57 communicates intermediate its ends with a channel 59 which extends into reservoir 56. Channel 59 has a check valve 60 inserted therein and it communicates at a point above check valve 60 with a low pressure relief valve 61 which discharges into reservoir 56. The lower ends of passages 49 and 51 communicate with valve casing 57 at opposite sides of channel 59. Passage 49 is connected to one end of casing 57 by a branch channel 49$^a$ and passage 51 is connected to the other end of casing 57 by a branch channel 51$^a$.

The arrangement is such that, when valve 58 is in the position shown and the pump starts to discharge liquid into passage 51, the liquid will tend to flow through channel 59 into reservoir 56 but check valve 60 prevents flow into reservoir 56 except through relief valve 61 the resistance of which causes pump pressure to rise and liquid to flow through channel 51ª into the right end of casing 57 and shift valve 58 against the left end of casing 57 in which position it blocks the end of passage 51 and uncovers the end of passage 49 so that the pump cannot discharge liquid into reservoir 56 but it can draw liquid from reservoir 56 through check valve 60, channel 59, valve casing 57 and passage 49. Then when the pump is reversed and starts to discharge liquid into passage 49, the resistance of relief valve 61 causes pump pressure to rise and liquid to flow through channel 49ª into the left end of casing 57 and move valve 58 into the position shown in which position it prevents the pump from discharging into reservoir 56 but permits the pump to draw liquid from reservoir 56.

When cylinder barrel 4 is rotated in a direction indicated by the arrow on cylinder barrel 4 in Fig. 2 and by the arrow on shaft 2 in Fig. 5 and slide block 12 is offset toward the right as shown in Fig. 2, liquid will be expelled by pistons 6 from cylinders 7 through valve port 31 and associated channels into passage 49 and cylinder 7 will be supplied with liquid through valve port 32 and associated channels from passage 51.

In valve 17, the angular length of each of bridges 33ª and 34ª is equal to or only slightly greater than the angular length of a port 8ᵇ. More specifically, each end of each of valve ports 31ª and 32ª is spaced from the horizontal centerline 62 of the pump an angular distance A which is equal to or only slightly greater than one-half the angular length of a cylinder port 8ᵇ so that each port 8ᵇ will move out of communication with one valve port just as or just after the piston 6 in the cylinder 7 connected to that port 8ᵇ reaches a dead-center position, that is when the axis of the piston crosses the horizontal centerline, and each port 8ᵇ will open to the other valve port just as or just after that piston 6 passes its dead-center position.

In valve 16, ports 31 and 32 have the trailing ends thereof in respect to the direction of rotation of cylinder barrel 4 spaced from the horizontal centerline 62 a distance A which is equal to or slightly greater than one-half the angular length of a cylinder port 8ª the same as in valve 17. But the leading ends of ports 31 and 32 in respect to the direction of rotation of cylinder barrel 4 are spaced from the horizontal centerline such a distance B that a cylinder port 8ª will not open to a valve port 31 or 32 until after the piston in the cylinder 7 connected to that port 8ª has moved far enough beyond its dead-center position to have been forced into its cylinder a predetermined distance by thrust member 10.

The arrangement is such that, when slide block 12 is shifted to the limit of its movement toward the right as shown in Fig. 2 and cylinder barrel 4 is rotated in the direction indicated by the arrow thereon and by the large arrow on Fig. 10, the pistons above the horizontal centerline will move progressively outward and will draw liquid into their cylinders through passage 51 and port 32 and the pistons below the horizontal centerline will be forced progressively inward by thrust member 10 and, after passing a predetermined point below the horizontal centerline, they will eject liquid from their cylinders through port 31 into passage 49 as indicated by the small arrows associated with passages 49 and 51 in Fig. 10. Ports 31 and 31ª are thus the high pressure ports and ports 32 and 32ª are thus the low pressure ports.

As soon as piston 6 passes below the horizontal centerline or dead-center position, the port 8ᵇ connected to the cylinder 7 of that piston will open to valve port 31ª but the cylinder port 8ª connected to that cylinder will not open to port 31 until after that piston has moved a predetermined distance below its dead-center position as shown schematically in Fig. 10. As soon as that port 8ᵇ opens to port 31ª, the high pressure in port 31ª will extend through that port 8ᵇ into the associated check valve 20 and will assist the spring 25 thereof in holding that check valve 20 closed. The piston after moving below its dead-center position will tend to force liquid out of its cylinder but it cannot do so until it has created therein a pressure which exceeds the pressure in port 31ª by an amount sufficient to overcome the resistance of spring 25. Then check valve 20 will open and liquid will momentarily flow therethrough and through valve port 31ª, passage 48ª and passage 52 into passage 49 as indicated by the small arrows in Fig. 10.

An instant after the port 8ᵇ opens to port 31ª the associated cylinder port 8ª will open to valve port 31 and then the liquid expelled by the piston from cylinder 7 will flow through cylinder port 8ª into valve port 31 and the check valve 20 will close. Since the pressure in the cylinder is slightly higher than the pressure in port 31 when port 8ª opens to port 31, there will be no back flow of liquid from the high pressure port into the cylinder and, consequently, no shock nor resultant noise.

If slide block 12 is shifted to the limit of its movement toward the left from its neutral position in respect to Fig. 2, the pump will function in the above described manner except that ports 31 and 31ª will be the low pressure ports and ports 32 and 32ª will be the high pressure ports.

If the pump is of the constant displacement type, distance B on bridge 33 is the same as distance A and distance B on bridge 34 is such that a passage 8 will start to communicate with valve port 31 substantially as soon as a piston has moved far enough below centerline 62 to create a pressure sufficient to open a check valve 20, and the pump will function as explained above.

If the pump is of the reversible variable displacement type as shown, distance B on each of bridges 33 and 34 is somewhat greater than in a constant displacement pump for the reason that, in order to create the same pressure, a piston must move through a greater angular distance when the pump is at short stroke than when the pump is at full stroke.

The essential feature of this mechanism for silencing a pump is that the contents of each cylinder shall be compressed substantially to the discharge pressure before that cylinder opens to the discharge port. If each cylinder contained only solid oil or if the percentage of voids or gas in the oil were always the same, and if the piston stroke and the discharge pressure were constant, it would be possible to compute the angular distance through which a piston and cylinder must be rotated from the dead-center position to enable the piston to compress the contents of the cylinder to the discharge pressure and to then make distance B on valve 16 such that the cylinder would open to the discharge port at the instant that the contents of the cylinder had been compressed to the discharge pressure. But since all of those factors are variable, each distance B on valve 16 is made as great as feasible without requiring that the check valves be too large for the available spaces and without making either valve port too short to function properly as a suction port.

Many tests have shown that, when a properly designed pump is operating at full stroke, each cylinder will usually fill to 98% of capacity during the suction stroke of the piston in that cylinder. This indicates that, if each piston made 2% of its instroke before its cylinder opened to the discharge port, it would compress the contents of its cylinder to the discharge pressure and the first part of the discharge from that cylinder would pass through the check valve connected to that cylinder. When a pump is at full stroke, 2% of the instroke of a piston is effected during rotation of the piston through 11° from the dead-center position. When a pump is at quarter stroke, rotation of a piston through 23° is required to move the piston 2% of its stroke but at short strokes the velocity of the liquid through the suction port of the valve is correspondingly less than at full stroke so that the cylinder is more nearly filled with liquid and less movement of the piston is required to compress the contents of the cylinder to the discharge pressure.

If distance B were so great that a passage 8 would not open to the discharge port in valve 16 until after the piston in the cylinder connected to that passage had created a pressure high enough to open the check valve 20 in that passage when the pump was at minimum stroke, each piston would eject liquid from its cylinder through a check valve 20 at such a high velocity when the pump was at full stroke that large check valves would be required.

Therefore, in a variable displacement pump, distance B is such that, when the pump is at an intermediate stroke, a passage 8 will open to the discharge port in valve 16 as soon as the piston in the cylinder connected to that passage has moved far enough beyond centerline 62 to create a pressure high enough to open the check valve 20 in that passage. The pump will function as explained above at the intermediate stroke and at all strokes between intermediate and full stroke.

At strokes less than the intermediate stroke, the check valves will not open but each piston will create some pressure in its cylinder before its cylinder opens to the discharge port in valve 16 so that the back-flow of liquid from the discharge port into the cylinder is less than it would be if each cylinder opened to the discharge port as soon as it passed beyond centerline 62, as is the case in the prior pumps, and consequently the shocks and noise are reduced to a minimum when the pump is operating at a stroke less than the intermediate stroke. Also, many pumps never operate at strokes less than the intermediate stroke and other pumps operate at short stroke only at brief intervals. The result is that in a variable displacement pump embodying the invention the shocks and noise are substantially eliminated during all or the greater part of the operation of the pump and are greatly reduced during the brief intervals that the pump operates at short stroke.

The pressure in the high pressure port of main valve 16 and in the lubricating film between valve 16 and wear plate 18 exerts a blow-off force which tends to move cylinder barrel 4 toward the right away from valve 16 and, if it were not for auxiliary valve 17, means would have to be provided to prevent cylinder barrel 4 from being moved away from valve 16 by the blow-off force. However, the pressure in the high pressure port of auxiliary valve 17 and in the lubricating film between valve 17 and wear plate 19 exerts a blow-off force which tends to move cylinder barrel 4 toward the left away from valve 17. The two blow-off forces are in opposition to each other and, by having the ports in the two valves and the lands around the ports of substantially the same area, the two blow-off forces are substantially equal and cylinder barrel 4 is substantially hydrostatically balanced axially. Auxiliary valve 17 thus performs the dual function of substantially hydrostatically balancing cylinder barrel 4 axially and preventing the shocks and noise due to sudden compression of the liquid in the pump cylinders.

*Figs. 11–15*

Except for the arrangement of the valve ports and the addition of check valves, the pump shown in these figures is substantially the same as the pump shown in Patent No. 2,661,701 to which reference may be had for details of construction. Consequently, only so much of the pump has been shown as is necessary to an explanation of the invention.

The mechanism of the pump is arranged within a housing 71 having two hollow trunnions 72 and 73 fixed in its side walls. The pump is adapted to be connected to an external circuit by means of two ports which communicate through passages in housing 71 with the interiors of trunnions 72 and 73 and which are arranged directly under the trunnions so that neither the ports nor the passages appear in the drawings.

Trunnions 72 and 73 pivotally support a hollow cradle 74 comprising an annular body portion, which has two integral arms 74ª and 74ᵇ formed upon opposite sides thereof, and an end head 74ᶜ rigidly secured to the body portion. Arms 74ª and 74ᵇ are pivoted, respectively, upon trunnions 72 and 73 and form fluid tight joints therewith. Arm 74ª has an internal passage 75 which communicates with the interior of trunnion 72 and arm 74ᵇ has an internal passage 76 which communicates with the interior of trunnion 73. The rear ends of passages 75 and 76 communicate, respectively, with two passages 75ª and 76ª which are formed in cradle head 74ᶜ.

Cradle head 74ᶜ is of substantial thickness and it has an integral hub 77 extending from its inner or forward face. A horn 78 is rigidly secured in hub 77 and in head 74ᶜ upon the axis of cradle 74 to rotatably support an annular cylinder barrel 79 having an annular cylinder head 79ª arranged upon its inner end, a bearing 80 being arranged between cylinder head 79ª and horn 78.

Cylinder barrel 79 has a plurality of cylinders 81 formed therein around and parallel to its axis of rotation and each cylinder 81 communicates with a passage 82 which extends through end head 79ª and has its rear end elongated, as indicated by the dotted oval in Fig. 14, to form a cylinder port through which liquid flows to and from the cylinder. Cylinder barrel 79 and its head 79ª are ordinarily made as separate parts for convenience in manufacturing and the two parts are rigidly secured to each other to form a fluid tight joint therebetween. The rear face of end head 79ª engages an annular flat valve 83 which extends around hub 77 between cylinder head 79ª and cradle head 74ᶜ to control communication between cylinders 81 and passages 75ª and 76ª as will presently be explained.

Each cylinder 81 has a piston 84 fitted therein and each piston 84 is connected by a ball and socket joint 85 to a thrust member 86 fixed to the inner end of a drive shaft 87 which extends through the front wall of housing 71 for connection to a source of power.

Rotation is imparted from shaft 87 to cylinder barrel 79 through a universal joint 88 having the front or driven part thereof fixed for rotation with shaft 87 and the rear or driving part thereof fixed to the inner part 89 of an Oldham coupling the outer part 90 of which is fixed to the outer end of cylinder barrel 79. A bearing 91 is arranged between horn 78 and the outer part 90 of the Oldham coupling so that cylinder barrel 79 is supported by bearings 80 and 91 for rotation upon the axis of horn 78. The rear part of universal joint 88 is provided with a tail shaft 92 which has its rear end journaled in a bearing 93 arranged within horn 78 and which holds the axis of the rear part of universal joint 88 upon the axis of cylinder barrel 79.

The arrangement is such that, when shaft 87 is rotated, cylinder barrel 79 will be rotated from shaft 87 through universal joint 88 and Oldham coupling 89—90. The rear face of thrust member 86 rotates in a plane normal to the axis of shaft 87 and, if the axis of cylinder barrel 79 is inclined to the axis of thrust member 86 by tilting cradle 74 upward or downward, thrust member 86 will reciprocate pistons 84 in their cylinders during rotation of thrust member 86 and cylinder barrel 79 but, if the axis of cylinder barrel 79 is coincident with the axis of thrust member 86, no reciprocation of pistons 84 will occur.

During rotation of cylinder barrel 79, each passage 82 will register successively with two arcuate ports 94 and 95 (Figs. 13 and 14) which are formed in valve 83 and extend inward from the contact face thereof. A plurality of holes 96 extend rearward from the bottom of port 94 and an equal number of holes 97 extend rearward from the bottom of port 95. Each hole 96 communicates with a hold-up motor 98 which is arranged within valve 83 and each hole 97 communicates with a hold-up motor 99 which is arranged within valve 83. Each hold-up motor 98 communicates with a hole 100 which is formed in cradle head 74ᶜ and communicates with passage 75ᵃ and each hold-up motor 99 communicates with a hole 101 which is formed in cradle head 74ᶜ and communicates with passage 76ᵃ.

Hold-up motors 98 and 99 are identical and each includes a cylinder 102 which is formed in valve 83 in alinement with a hole 96 or 97, a hollow piston 103 which is fitted in cylinder 102, an annular sealing member 104 which is arranged between piston 103 and cradle head 74ᶜ and is concentric with piston 103 and with a hole 100 or 101, and a spring 105 which is arranged between piston 103 and the end wall of cylinder 102 to urge valve 83 against end head 79ᵃ and to urge piston 103 against sealing member 104 and sealing member 104 against cradle head 74ᶜ. The rear end of sealing member 104 and the front face of cradle head 74ᶜ adjacent hole 100 or 101 are made flat and smooth and the front end of sealing member 104 and the rear end of piston 103 are made spherical and smooth to form substantially liquid tight joints therebetween.

The annular inward portion of cylinder head 79ᵃ is engaged by an annular auxiliary valve 110 which extends around horn 78 and is arranged within the annular body portion of cylinder barrel 79. In the particular pump shown, auxiliary valve 110 is necessarily smaller in diameter than main valve 83, but if cylinder barrel 79 were made considerably larger in diameter relatively to the diameter of hub 77 so that it could be provided with a greater number of cylinders 81 and pistons 84, auxiliary valve 110 could be substantially the same size as main valve 83.

Auxiliary valve 110 has arranged therein a hold-up motor 98ᵃ in the radial plane of each of hold-up motors 98 in main valve 83 and a hold-up motor 99ᵃ in the radial plane of each of the hold-up motors 99 in main valve 83. Hold-up motors 98ᵃ and 99ᵃ function in the same manner as and are identical to hold-up motors 98 and 99 except that they are necessarily smaller. Therefore a description thereof is deemed unnecessary.

The pistons of hold-up motors 98ᵃ and 99ᵃ react against an annular abutment 111 which is pressed upon horn 78 within the annular inner wall of cylinder barrel 79 and is prevented from moving axially in any suitable manner such as by engaging a shoulder on horn 78. Rotation of auxiliary valve 110 is prevented by two pins (not shown) which are fixed in abutment 111 and extend into valve 110 with sufficient clearance to permit the rear face of valve 110 to adjust itself to the front face of cylinder barrel head 79ᵃ.

Abutment 111 has formed therein an arcuate chamber 112 which communicates with each of hold-up motors 98ᵃ through a hole 113 and an arcuate chamber 114 which communicates with each of hold-up motors 99ᵃ through a hole 115. Chamber 112 communicates with one end of a passage 116 which extends therefrom radially inward through abutment 111 into horn 78, then extends rearward through horn 78 and then extends rearward and radially outward through horn 78 and cradle head 74ᶜ into communication with passage 75ᵃ. Likewise, channel 114 communicates with one end of a passage 117 which extends therefrom radially inward through abutment 111 into horn 78, then extends rearward through horn 78 and then extends rearward and radially outward through horn 78 and cradle head 74ᶜ into communication with passage 76ᵃ.

Auxiliary valve 110 has two arcuate ports 118 and 119 formed in the rear face thereof, a hole 120 extending from the bottom of port 118 into communication with each hold-up motor 98ᵃ and a hole 121 extending from the bottom of port 119 into communication with each hold-up motor 99ᵃ. Port 118 is thus connected through holes 120, hold-up motors 98ᵃ, holes 113, chamber 112, passages 116 and 75ᵃ, holes 100, hold-up motors 98 and holes 96 to port 94 in valve 83. Likewise, port 119 is connected through holes 121, hold-up motors 99ᵃ, holes 115, chamber 114, passages 117 and 76ᵃ, holes 101, hold-up motors 99 and holes 97 to port 95 in valve 83. Consequently, the pressure in port 118 is always the same as the pressure in port 94 and the pressure in port 119 is always the same as the pressure in port 95.

Liquid is adapted to flow into port 118 or port 119 through a plurality of passages 122 one of which extends from each of passages 82 and terminates in a cylinder port 123 formed in the front face of cylinder head 79ᵃ upon the same radius as ports 118 and 119. Each of passages 122 has arranged therein a check valve 124 which permits liquid to flow from passage 82 into port 118 or 119 but prevents flow of liquid from port 118 or 119 into passage 82.

In auxiliary valve 110, the adjacent ends of ports 118 and 119 are spaced apart an angular distance equal to or only slightly greater than the angular length of a cylinder port 123 so that during rotation of cylinder barrel 79 each cylinder port 123 will open to one valve port immediately after it moves out of communication with the other valve port.

Since the pump is of the reversible variable displacement type, ports 94 and 95 in main valve 83 are arranged in the same manner as the ports 31 and 32 in the valve 16 of the pump shown in Figs. 1–10 and for the same reasons. That is, the trailing end of each of ports 94 and 95 in respect to the direction of rotation of cylinder barrel 79 is spaced from the vertical centerline 125 of the pump an angular distance A which is equal to or only slightly greater than one-half the angular length of the end of a passage 82 so that during rotation of cylinder barrel 79 each passage 82 will have moved out of communication with the valve port when it arrives upon the vertical centerline. But the leading ends of ports 94 and 95 in respect to the direction of rotation of cylinder barrel 79 are spaced from the vertical centerline such an angular distance B that, when the pump is adjusted to a predetermined intermediate stroke, a passage 82 will open to a valve port only after the cylinder 81 connected to that passage has moved far enough beyond the vertical centerline to cause the piston in that cylinder to create a pressure high enough to open the check valve 124 connected to that cylinder.

The arrangement is such that, when the pump is adjusted to a stroke at least as great as the predetermined intermediate stroke, cylinder barrel 79 is rotated in the direction of the arrow in Fig. 12 and cradle 74 is tilted downward below its horizontal position, the pistons 84 at the right of the vertical centerline in respect to Fig. 12 will be drawn progressively outward and will draw liquid into their cylinders 81 from valve port 95 and the pistons 84 at the left of the vertical centerline will be forced progressively inward and, after passing a short distance beyond the vertical centerline, they will eject liquid from their cylinders into valve port 94.

The instant that a cylinder 81 passes to the right of the vertical centerline 125, the cylinder port 123 connected to that cylinder opens to auxiliary port 118, as indicated by the dotted circle in Fig. 15, and the piston 84 in that cylinder starts to move inward but it cannot at that instant eject liquid from the cylinder because the passage 82 connected to that cylinder is blocked by the face of valve 83, as indicated by the dotted oval in Fig. 14, and because the pressure in port 118 extended into check valve 124 and held it closed the instant that port 123 opened to the port 118. The piston in that cylinder will continue to move inward and it will very quickly create a pressure which exceeds the pressure in port 118 by an amount sufficient to open check valve 124. Then the piston will eject liquid from its cylinder through passages 82 and 122, check valve 124, cylinder port 123, valve port 118, holes 120, hold-up motors 98ᵃ, holes 113, chamber 112 and passage 116 into passage 75ᵃ and thence into the external circuit.

An instant after check valve 124 opens, the passage 82 connected to that cylinder will open to port 94 and then the liquid being expelled from that cylinder will flow through passage 82, port 94, holes 96, hold-up motors 98 and holes 100 into passage 75a and thence into the external circuit. The instant that passage 82 opens to port 94 the pressure upon opposite sides of check valve 124 will be equalized and check valve 124 will close. Since the pressure in the cylinder is slightly higher than the pressure in high pressure port 94 when the cylinder opens to the high pressure port, there will be no backflow of liquid from the high pressure port into the cylinder and, consequently, no shock nor resultant noise.

If cradle 74 is tilted upward above its horizontal position, the pump will function in the above described manner except that ports 95 and 119 will be the high pressure ports and ports 94 and 118 will be the low pressure ports.

It the pump should be operated at strokes less than the predetermined intermediate stroke, check valves 124 would not open and there would be no discharge of liquid through auxiliary valve 110 but the pump would operate more quietly than the prior pumps because each piston would have created some pressure in its cylinder before its cylinder opened to the discharge port in the main valve and, hence, there would be less back flow of liquid from the dicharge port into the cylinder and less resultant shock and noise.

The pressure in the high pressure port of main valve 83 and in the lubricating film between valve 83 and cylinder barrel head 79a exerts a blow-off force which tends to move cylinder barrel 79 toward the left away from valve 83 and, if it were not for auxiliary valve 110, an excessive axial thrust would be imposed upon the cylinder barrel bearings. However, the pressure in the high pressure port of auxiliary valve 110 and in the lubricating film between valve 110 and cylinder barrel head 79a exerts a force which tends to move cylinder barrel 79 toward the right.

Cylinder barrel 79 is also urged toward the right by the pumping forces transmitted to cylinder barrel head 79a through the pistons 84 and cylinders 81 on the high pressure side of the pump. Auxiliary valve 110 may be so proportioned that the sum of the forces urging cylinder barrel 79 toward the right would be equal to the blow-off force so that cylinder barrel 79 would be hydrostatically balanced axially but in practice valve 110 is so proportioned that the sum of the forces urging cylinder barrel 79 toward the right is slightly less than the blow-off force and the difference between the forces is taken by bearing 91. Auxiliary valve 110 thus performs dual functions in that it relieves the cylinder barrel bearings from a great part of the axial thrust thereon and in that, together with check valves 124, it prevents shocks and noise due to sudden compression of liquid in the cylinders.

Figure 18:
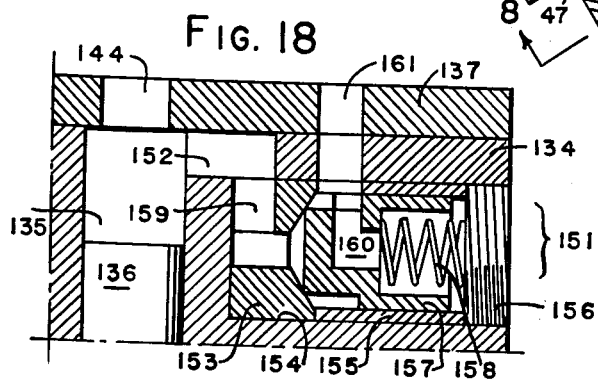
Fig. 18 is an enlarged view of the check valve shown in Fig. 17 and the parts adjacent thereto.
Figure 17:
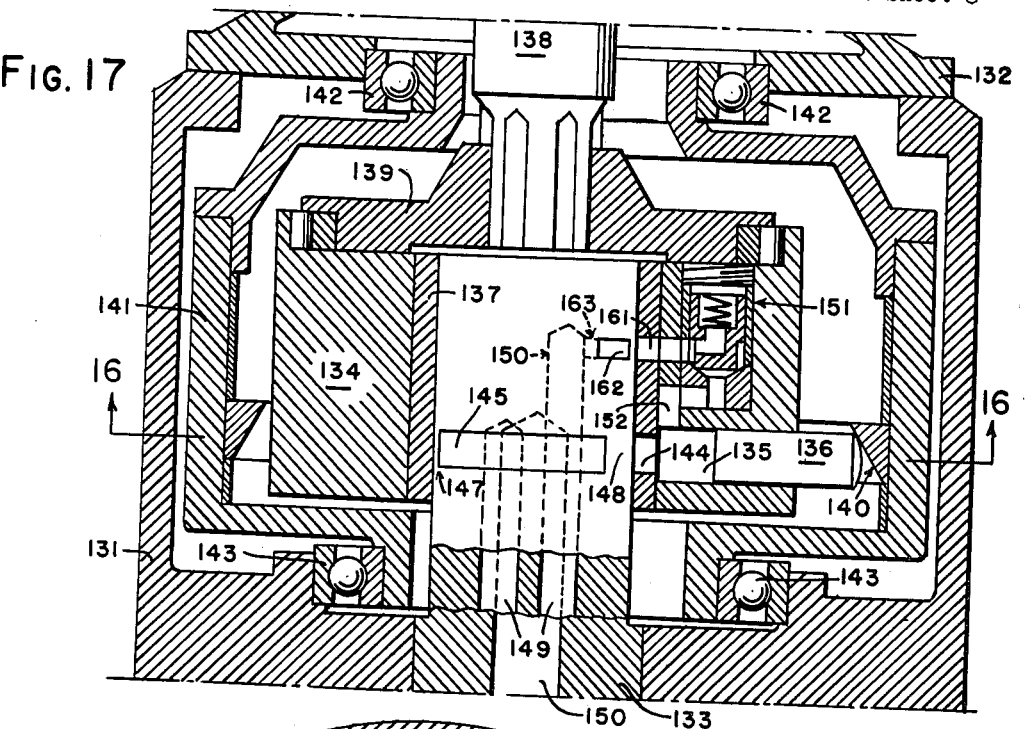
Fig. 17 is a sectional plan view taken on the line 17—17 of Fig. 16 and showing only the central portion of the pump.
Figure 16:
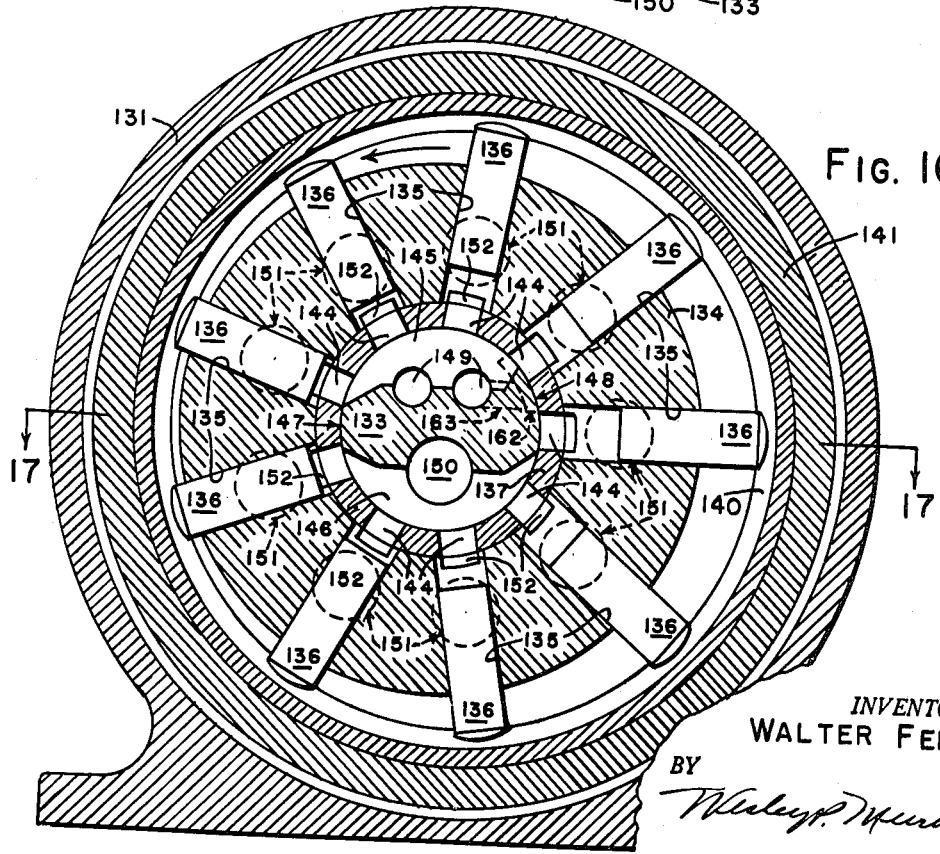
Fig. 16 is a transverse section through a pintle type radial piston pump to which the invention has been applied, the plane of the view being indicated by the line 16—16 of Fig. 17.

*Figs. 16–18*

The pump shown in these figures is similar to the pump of the transmission fully illustrated and described in Patent No. 2,186,409. Consequently, only so much of the pump has been shown as is necessary to an explanation of the invention. The mechanism of the pump is arranged within and carried by a casing 131 which is closed at its front end by a removable end head 132 and has a valve shaft or pintle 133 rigidly secured in its rear wall.

Pintle 133 has journaled thereon a rotatable cylinder barrel 134 having a plurality of radial cylinders 135 arranged therein in a circular row with a piston 136 fitted in each cylinder. Cylinder barrel 134 includes a liner 137 which is pressed therein and closely fitted upon pintle 133 to rotate thereon. Rotation of cylinder barrel 134 is effected by a drive shaft 138 which is connected thereto by a coupling 139 and which is journaled in bearings (not shown) carried by end head 132.

The outer ends of pistons 136 normally engage an annular reaction surface 140 which is eccentric to cylinder barrel 134 and is inclined to the axes of the pistons. Reaction surface 140 is arranged upon the inside of a thrust member 141 which rotates upon an axis offset from the axis of cylinder barrel 134 and is rotatably supported by two bearings 142 and 143 carried, respectively, by end head 132 and rear wall of casing 131.

Each cylinder 135 communicates at its inner end with a cylinder port 144 which is formed in liner 137 and is adapted during rotation of cylinder barrel 134 to communicate first with one and then with the other of two pintle ports 145 and 146 which are formed in pintle 133 diametrically opposite each other. The ends of pintle ports 145 and 146 are separated from each other by unbroken portions of the pintle surface constituting liquid seals or bridges 147 and 148 which prevent a cylinder port 144 from communicating with both of the pintle ports simultaneously.

Pintle port 145 is the high pressure or discharge port and it communicates with two passages 149 which are formed axially within pintle 133 and are adapted to be connected to the high pressure side of an external circuit through passages not shown. Pintle port 146 is the low pressure or intake port and it communicates with a passage 150 which is formed axially within pintle 133 and is adapted to be connected through passages not shown to the low pressure side of an external circuit and/or to a reservoir containing a supply of liquid.

The arrangement is such that, when cylinder barrel 134 is rotated in the direction of the arrow on Fig. 16, reaction surface 140 will force each piston 136 progressively inward as the piston moves from a horizontal position at the right of Fig. 16 to a horizontal position at the left of Fig. 16 and centrifugal force will cause each piston to move progressively outward as it moves from a horizontal position to the left of Fig. 16 to a horizontal position at the right of Fig. 16. Each outward moving piston will draw liquid into its cylinder through its cylinder port 144, pintle port 146 and passage 150 from the low pressure side of an external circuit and/or from a reservoir and each inward moving piston will eject liquid from its cylinder through its cylinder port 144, pintle port 145 and passages 149 into the high pressure side of an external circuit.

Bridge 147 extends both above and below the horizontal centerline of pintle 133 through an angular distance equal to or only slightly greater than one-half the angular length of a cylinder port 144 so that the port 144 of each cylinder 135 will move out of communication with pintle port 145 just as or just before the piston in that cylinder reaches a horizontal or dead-center position at the left of Fig. 16 and that cylinder port will open to pintle port 146 just as or just after that piston passes beyond a horizontal position.

Bridge 148 extends below the horizontal centerline of pintle 133 through an angular distance equal to or only slightly greater than one-half the angular length of a cylinder port 144 so that the port 144 of each cylinder 135 will move out of communication with pintle port 146 just as or just before the piston in that cylinder reaches a horizontal or dead-center position at the right of Fig. 16. Bridge 148 extends above the horizontal centerline of pintle 133 through such an angular distance that the port 144 of each cylinder 135 will not open to pintle port 145 until after the piston in that cylinder has been forced inward a predetermined distance as will presently be explained.

Each cylinder 135 also communicates with a check valve 151 through an axial passage 152 which is formed in the inner peripheral surface of cylinder barrel 134 and is closed on its radially inward side by liner 137. Check valves 151 may be of any suitable type but for the purpose of illustration each check valve has been shown in Fig. 18 as including an annular valve seat 153 which is fitted in the inner end of a bore 154 formed axially in cylinder barrel 134, a sleeve 155 which is fitted in bore 154 between valve seat 153 and a plug 156 which closes the outer end of bore 154, a valve 157 which is fitted in sleeve 155, and a spring 158 which urges valve 157 against valve seat 153.

Valve seat 153 has a passage 159 extending radially from its central opening into communication with passage 152 so that the inner end of valve 157 is subjected to any pressure prevailing in the cylinder 135 associated therewith. The portion of valve 157 immediately above valve seat 153 is reduced in diameter and a passage 160 extends radially inward through the reduced portion and then extends axially into communication with the chamber containing spring 158 so that any pressure prevailing above valve seat 153 will assist spring 158 in holding valve 157 against seat 153. The interior of sleeve 155 immediately above valve seat 153 communicates with a passage 161 which extends through sleeve 155, cylinder barrel 134 and liner 137.

The inner end of passage 161 constitutes an auxiliary cylinder port which, during rotation of cylinder barrel 134, will register momentarily with an auxiliary valve port 162 which is formed in pintle 133 and has a hole 163 extending from the bottom thereof into communication with one of the passages 149. Valve port 162 is so located that, as soon as a piston 135 moves above a horizontal position at the right of Fig. 16, the passage 161 leading from the check valve connected to the cylinder of that piston will open to port 162.

The arrangement is such that, when a piston 136 moves above a horizontal position at the right of Fig. 16, reaction surface 140 will start to force that piston into its cylinder 135 and the passage 161 leading to the check valve 151 connected to that cylinder will open to auxiliary valve port 162. At that instant the port 144 of that cylinder is blocked by bridge 148 and, as soon as passage 161 opens to port 162, the high pressure in pintle port 145 extends through passages 150 and 163, port 162 and passage 161 into check valve 151 and holds it closed. Therefore, the piston cannot eject liquid from its cylinder until it has created therein a pressure which exceeds the pressure in port 145 by an amount sufficient to overcome the resistance of spring 158 and the friction of valve 157. Then check valve 151 will open and the piston can eject liquid from its cylinder through passage 152, check valve 151, passage 161, auxiliary port 162 and passage 163 into passage 149.

An instant after check valve 151 opens, cylinder port 144 will open to valve port 145 but there will be no back flow of liquid from the valve port into the cylinder and hence no resultant shock nor noise because the pressure in the cylinder was slightly higher than the pressure in the valve port before the cylinder opened to the valve port.

The invention herein set forth may be modified in various other ways and applied to other types of pumps without departing from the scope of the invention which is hereby claimed as follows:

1. In a pump, the combination of two relatively rotatable members the first of which has a plurality of expansible and contractible pumping chambers and a main passage and an auxiliary passage communicating with each chamber and the second of which has valve means including a main valve having an intake port and a discharge port with which each of said main passages communicates alternately during relative rotation of said members and an auxiliary valve having an auxiliary port which communicates with said discharge port and with which said auxiliary passages communicate successively during relative rotation of said members, means responsive to relative rotation of said members for expanding and contracting said chambers alternately to thereby cause liquid to be drawn into and discharged from said chambers, and a check valve normally closing each of said auxiliary passages, said discharge port and said auxiliary port being so located that each of said auxiliary passages will communicate with said auxiliary port immediately after the chamber connected to that passage starts to contract but the main passage from that chamber will communicate with said discharge port only after said chamber has contracted a substantial amount so that the first part of the discharge from said chamber must pass through said check valve into said auxiliary port while the remaining part of the discharge from said chamber may pass freely through said main branch into said discharge port.

2. In a pump, the combination of two relatively rotatable members the first of which has a plurality of expansible and contractible pumping chambers and a passage leading from each chamber and the second of which has valve means including a main valve having an intake port and a discharge port with which each of said chambers communicates alternately during relative rotation of said members and an auxiliary valve having an auxiliary port which communicates with said discharge port and with which said passages communicate successively during relative rotation of said members, means responsive to relative rotation of said members for expanding and contracting said chambers alternately to thereby cause liquid to be drawn into and discharged from said chambers, and a normally closed check valve arranged in each of said passages, said discharge port and said auxiliary port being so located that each passage will communicate with said auxiliary port immediately after the chamber connected to that passage starts to contract but that chamber will communicate with said discharge port only after said chamber has contracted a substantial amount so that the first part of the discharge from said chamber must pass through said check valve into said auxiliary port while the remaining part of the discharge from said chamber may pass freely into said discharge port.

3. In a pump, the combination of two relatively rotatable members one of which has a plurality of cylinders arranged therein and the other of which is provided with valve means for controlling the flow of liquid to and from said cylinders and including a main valve having an intake port and a discharge port with which each of said cylinders communicates alternately during relative rotation of said members, said valve means also including an auxiliary valve having an auxiliary port which communicates with said discharge port, a piston fitted in each of said cylinders, means for causing said pistons to move inward and outward alternately during relative rotation of said members, said discharge port being so located that each cylinder will communicate therewith only after the piston in that cylinder has moved inward a substantial distance to create pressure in said cylinder, and a normally closed check valve associated with each of said cylinders and arranged in said cylinder member with its inlet connected to the cylinder associated therewith, said cylinder member also having formed therein a plurality of passages each of which communicates with the outlet of one of said check valves and is so located that it communicates with said auxiliary port substantially as soon as the piston in the cylinder associated with that check valve starts to move inward so that the pressure in said discharge port may extend into said check valve and hold it closed until the pressure in said associated cylinder exceeds the pressure in said discharge port.

4. In a pump, the combination of a rotatable cylinder barrel having a plurality of cylinders arranged therein and a cylinder port communicating with each cylinder, non-rotatable valve means engaging said cylinder barrel to control the flow of liquid to and from said cylinders and including a main valve having an intake port and a discharge port with which each cylinder port communicates alternately during rotation of said cylinder barrel and an auxiliary valve having an auxiliary port communicating with said discharge port, a piston fitted in each of said cylinders, means for causing said pistons to move inward and outward alternately during rotation of said cylinder barrel, said discharge port being so located that the port of each cylinder will communicate therewith only after the piston in that cylinder has moved a substantial distance inward to create pressure in that cylinder, and a normally closed check valve associated with each of said cylinders and arranged in said cylinder barrel with its inlet connected to the cylinder associated therewith, and means for connecting the outlet of each of said check valves to said auxiliary port substantially as soon as the piston in the cylinder associated with that check valve starts to move inward so that the pressure in said discharge port may extend into said check valve and hold it closed until the pressure in said associated cylinder exceeds the pressure in said discharge port.

5. In a pump, the combination of a rotatable cylinder barrel having a plurality of cylinders arranged therein and a cylinder port communicating with each cylinder, non-rotatable valve means engaging said cylinder barrel to control the flow of liquid to and from said cylinders and including a main valve having an intake port and a discharge port with which each cylinder port communicates alternately during rotation of said cylinder barrel and an auxiliary valve having an auxiliary port which communicates with said discharge port, a piston fitted in each of said cylinders, means for causing said pistons to move inward and outward alternately during rotation of said cylinder barrel, said discharge port being so located that the port of each cylinder will communicate therewith only after the piston in that cylinder has moved a substantial distance inward to create pressure in that cylinder, and a normally closed check valve associated with each of said cylinders and arranged in said cylinder barrel with its inlet connected to the cylinder associated therewith, said cylinder member also having formed therein a plurality of passages each of which communicates with the outlet of one of said check valves and is so located that it communicates with said auxiliary port substantially as soon as the piston in the cylinder associated with that check valve starts to move inward so that the pressure in said discharge ports may extend into said check valve and hold it closed until the pressure in said associated cylinder exceeds the pressure in said discharge port.

6. In a pump, the combination of a rotatable cylinder barrel having a plurality of cylinders arranged therein and a piston fitted in each cylinder, means for rotating said cylinder barrel, non-rotatable valve means engaging said cylinder barrel to control the flow of liquid to and from said cylinders and including a main valve having two ports with which each of said cylinders communicates alternately during rotation of said cylinder and which are arranged upon opposite sides of a centerline passing through the axis of said cylinder barrel, said main valve also having bridges between the adjacent ends of said ports to provide seals therebetween, means operable during rotation of said cylinder barrel for causing each piston after it crosses said centerline at one side of said pump to move outward and to draw liquid into its cylinder from one of said ports which is the intake port and for causing each piston after it crosses said centerline at the other side of said pump to move inward and to eject liquid from its cylinder into the other of said ports which is the discharge port, each of said bridges extending from said centerline such a distance in a direction opposite to the direction of rotation of said cylinder barrel that each cylinder will move out of communication with said intake port substantially the instant the axis of that cylinder reaches said centerline and each of said bridges extending from said centerline such a distance in the direction of rotation of said cylinder barrel that each cylinder will open to said discharge port only after it has been rotated beyond said centerline far enough to cause the piston in that cylinder to create pressure therein, said valve means also including an auxiliary valve having an auxiliary port communicating with said discharge port, a normally closed check valve associated with each of said cylinders and arranged in said cylinder barrel with its inlet connected to the cylinder associated therewith and its outlet so located that it will open to said auxiliary port for connecting the outlet of each of said check valves to said discharge port substantially as soon as the piston in the cylinder associated with that check valve starts to move inward so that the pressure in said discharge port may extend into said check valve and hold it closed until the pressure in said associated cylinder exceeds the pressure in said discharge port.

7. In a pump, the combination of a rotatable cylinder barrel having a plurality of cylinders arranged therein and a piston fitted in each cylinder, means for rotating said cylinder barrel, non-rotatable valve means engaging said cylinder barrel to control the flow of liquid to and from said cylinders and including a main valve having two ports with which each of said cylinders communicates alternately during rotation of said cylinder and which are arranged upon opposite sides of a centerline passing through the axis of said cylinder barrel, said main valve also having bridges between the adjacent ends of said ports to provide seals therebetween, means operable during rotation of said cylinder barrel for causing each piston after it crosses said centerline at one side of said pump to move outward and to draw liquid into its cylinder from one of said ports which is the intake port and for causing each piston after it crosses said centerline at the other side of said pump to move inward and to eject liquid from its cylinder into the other of said ports which is the discharge port, said valve means also including an auxiliary valve having two auxiliary ports arranged upon opposite sides of said centerline and each communicating with the main valve port on the same side of said centerline, each of said bridges extending from said centerline such a distance in a direction opposite to the direction of rotation of said cylinder barrel that each cylinder will move out of communication with said intake port substantially the instant the axis of that cylinder reaches said centerline and each of said bridges extending from said centerline such a distance in the direction of rotation of said cylinder barrel that each cylinder will open to said discharge port only after it has been rotated beyond said centerline far enough to cause the piston in that cylinder to create pressure therein, and a normally closed check valve associated with each of said cylinders and arranged in said cylinder barrel with its inlet connected to the cylinder associated therewith, said cylinder member also having formed therein a plurality of passages each of which communicates with the outlet of one of said check valves and is so located that it communicates with an auxiliary port substantially as soon as the piston in the cylinder associated with that check valve starts to move inward so that the pressure in said discharge port may extend into said check valve and hold it closed until the pressure in said associated cylinder exceeds the pressure in said discharge port.

8. In a pump, the combination of a rotatable cylinder barrel having a plurality of cylinders arranged therein and a piston fitted in each cylinder, means for rotating said cylinder barrel, a normally closed check valve associated with each of said cylinders and having an inlet connected to the associated cylinder and an outlet leading from said check valve, a non-rotatable main valve engaging said cylinder barrel and having an intake port and a main discharge port with which each of said cylinders communicates alternately during rotation of said cylinder barrel, a non-rotatable auxiliary valve engaging said cylinder barrel and having an auxiliary discharge port with which the outlets of said check valves communicate successively during rotation of said cylinder barrel, and means for causing said pistons to move inward and outward alternately during rotation of said cylinder barrel, said main discharge port being so located that the port of each cylinder will communicate therewith only after the piston in that cylinder has moved inward far enough to create pressure in that cylinder and said auxiliary discharge port being so located that the outlet of each of said check valves will open thereto substantially as soon as the piston in the cylinder associated with that check valve starts to move inward so that the pressure in said discharge ports may extend into said check valve and hold it closed until the pressure in said associated cylinder exceeds the pressure in said discharge port and then said piston may eject liquid from that cylinder into said auxiliary discharge port.

9. In a pump, the combination of a rotatable cylinder barrel having a plurality of cylinders arranged therein and a piston fitted in each cylinder, means for rotating said cylinder barrel, a main valve seat arranged upon said cylinder barrel normal to the axis thereof and having formed therein a plurality of cylinder ports each of which communicates with one of said cylinders, an auxiliary valve seat arranged upon said cylinder barrel in opposition to said main valve, a normally closed check valve associated with each of said cylinders and arranged in said cylinder barrel and having an inlet which is connected to the associated cylinder and an outlet which extends through said auxiliary valve seat, a non-rotatable main valve engaging said main valve seat and having an intake port and a main discharge port with which each of said cylinder ports communicates alternately during rotation of said cylinder barrel and which are arranged upon opposite sides of a centerline passing through the axis of said cylinder barrel, a non-rotatable auxiliary valve engaging said auxiliary valve seat in opposition to said main valve and having an auxiliary discharge port with which the outlets of said check valves communicate successively during rotation of said cylinder barrel and which is arranged upon the same side of said centerline as said main discharge port, means for connecting said auxiliary discharge port to said main discharge port, and means for causing said pistons to move inward and outward alternately during rotation of said cylinder barrel, said main discharge port being so located that the port of each cylinder will communicate therewith only after the piston in that cylinder has moved inward far enough to create pressure in that cylinder, and said auxiliary discharge port being so located that the outlet of each of said check valves will open thereto substantially as soon as the piston in the cylinder associated with that check valve starts to move inward so that the pressure in said discharge ports may extend into said check valve and hold it closed until the pressure in said associated cylinder exceeds the pressure in said discharge port and then said piston may eject liquid from that cylinder into said auxiliary discharge port.

10. In a pump, the combination of a rotatable cylinder barrel having a plurality of cylinders arranged therein and a piston fitted in each cylinder, means for rotating said cylinder barrel, a main valve seat arranged upon said cylinder barrel normal to the axis thereof and having formed therein a plurality of cylinder ports each of which communicates with one of said cylinders, an auxiliary valve seat arranged upon said cylinder barrel in opposition to said main valve, a normally closed check valve associated with each of said cylinders and arranged in said cylinder barrel and having an inlet which is connected to the associated cylinder and an outlet which extends through said auxiliary valve seat, a non-rotatable main valve engaging said main valve seat and having two ports with which each of said cylinder ports communicates alternately during rotation of said cylinder barrel and which are arranged upon opposite sides of a centerline passing through the axis of said cylinder barrel, means operable during rotation of said cylinder barrel for causing each piston after it crosses said centerline at one side of said pump to move outward and to draw liquid into its cylinder from one of said valve ports which is the intake port and for causing each piston after it crosses said centerline at the other side of said pump to move inward and to eject liquid from its cylinder into the other of said valve ports which is the main discharge port, said main valve also having bridges between the adjacent ends of said ports to provide seals therebetween, a non-rotatable auxiliary valve engaging said auxiliary valve seat in opposition to said main valve and having an auxiliary discharge port with which the outlets of said check valves communicate successively during rotation of said cylinder barrel and which is arranged upon the same side of said centerline as said main discharge port, and means for connecting said auxiliary discharge port to said main discharge port, each of said bridges extending from said centerline such a distance in a direction opposite to the direction of rotation of said cylinder barrel that the port of each cylinder will move out of communication with said intake port substantially the instant the axis of that cylinder reaches said centerline and each of said bridges extending from said centerline such a distance in the direction of rotation of said cylinder barrel that the port of each cylinder will open to said discharge port only after that cylinder has been rotated beyond said centerline far enough to cause the piston in that cylinder to create pressure therein, and said auxiliary discharge port being so located that the outlet of each of said check valves will open thereto substantially as soon as the piston in the cylinder associated with that check valve starts to move inward so that the pressure in said discharge ports may extend into said check valve and hold it closed until the pressure in said associated cylinder exceeds the pressure in said discharge port and then said piston may eject liquid from that cylinder into said auxiliary discharge port.

11. In a pump, the combination of a valve shaft or pintle having an intake port and a discharge port formed therein diametrically opposite each other and passages extending from said ports for connection to an external circuit, a rotatable cylinder barrel journaled upon said pintle and having a plurality of cylinders arranged therein and adapted to communicate with said pintle ports alternately during rotation of said cylinder barrel, a piston fitted in each of said cylinders, means responsive to rotation of said cylinder barrel for causing each of said pistons to move inward and outward as it is rotated from and to a dead center position, said discharge port being so located that each cylinder will communicate therewith only after the piston in that cylinder has been moved inward far enough to create pressure in that cylinder, a check valve associated with each cylinder and having an inlet connected to the associated cylinder and also having an outlet, and means for connecting the outlet of each check valve to said discharge port substantially as soon as the cylinder associated with that check valve passes beyond said dead center position so that the pressure in said discharge port can enter said check valve and hold it closed until the pressure in said associated cylinder exceeds the pressure in said discharge port.

12. In a pump, the combination of a valve shaft or pintle having an intake port and a discharge port formed therein diametrically opposite each other and passages extending from said ports for connection to an external circuit, a rotatable cylinder barrel journaled upon said pintle and having a plurality of cylinders arranged therein and adapted to communicate with said pintle ports alternately during rotation of said cylinder barrel, a piston fitted in each of said cylinders, means responsive to rotation of said cylinder barrel for causing each of said pistons to move inward and outward as it is rotated from and to a dead center position, said discharge port being so located that each cylinder will communicate therewith only after the piston in that cylinder has been moved inward far enough to create pressure in that cylinder, and a check valve associated with each cylinder and having an inlet connected to the associated cylinder and also having an outlet, said pintle also having formed therein an auxiliary port which is connected to said discharge port and is so located that the outlet of each check valve will communicate therewith substantially as soon as the cylinder associated with that check valve passes beyond said dead center position so that the pressure in said discharge port can enter said check valve and hold it closed until the pressure in said associated cylinder exceeds the pressure in said discharge port.

13. In a pump, the combination of a rotatable cylinder barrel having a plurality of main cylinder ports and a plurality of auxiliary cylinder ports, a plurality of cylinders arranged in said cylinder barrel with each cylinder communicating with one of said main cylinder ports and with one of said auxiliary ports, a check valve arranged between each of said auxiliary ports and the cylinder communicating therewith, a piston arranged in each of said cylinders, means responsive to rotation of said cylinder barrel for moving said pistons successively inward from a first dead center position and for permitting said pistons to move successively outward from a second dead center position, means for reversing the movements of said pistons, a main valve engaging said cylinder barrel and having two main valve ports with which each of said main cylinder ports communicates alternately during rotation of said cylinder barrel, means for connecting said main valve ports to opposite sides of a hydraulic circuit, an auxiliary valve engaging said cylinder barrel and having two auxiliary valve ports with which each of said auxiliary cylinder ports communicates alternately during rotation of said cylinder barrel, and means for connecting said auxiliary valve ports to opposite sides of said circuit, said auxiliary valve ports having the leading ends thereof so located that each auxiliary cylinder port will communicate with an auxiliary valve port immediately after the piston in the cylinder communicating with that auxiliary cylinder port starts to move inward fom a dead center position and said main valve ports having the leading ends thereof so located that each main cylinder port will communicate with a main valve port only after the piston in the cylinder communicating with that main valve port has moved inward a substantial distance from a dead center position.

14. A combination as set forth in claim 13 in which said main valve and said auxiliary valve engage said cylinder barrel in opposition to each other.

15. In a pump, the combination of a rotatable cylinder barrel having a plurality of axial passages extending therethrough, a plurality of pistons and cylinders arranged radially in said cylinder barrel with each of said cylinders communicating with one of said passages, means responsive to rotation of said cylinder barrel for moving said pistons successively inward from a first dead center position and for permitting said pistons to move successively outward from a second dead center position, a main valve engaging one end of said cylinder barrel and having a discharge port and an intake port with which one end of each of said passages communicates alternately during rotation of said cylinder barrel, means for connecting said discharge port and said intake port to the pressure and return sides respectively of a hydraulic circuit, an auxiliary valve engaging the other end of said cylinder barrel and having an auxiliary port with which the other ends of said passages communicate successively during rotation of said cylinder barrel, means for connecting said auxiliary port to the pressure side of said circuit, and a check valve arranged in each of said passages to prevent flow of liquid into said cylinders from said auxiliary port, said auxiliary port having the leading end thereof so located that each of said passages will communicate therewith immediately after the piston in the cylinder communicating with that passage starts to move inward from a dead center position and said discharge port having the leading end thereof so located that each of said passages will communicate therewith only after the piston in the cylinder communicating with that passage has moved inward a substantial distance from a dead center position.

16. A combination as set forth in claim 15 in which said auxiliary valve has two auxiliary valve ports, the leading ends of said auxiliary valve ports are so located that each of said passages will communicate with one of said auxiliary valve ports immediately after the piston in the cylinder communicating with that passage starts to move inward from either of said dead center positions and the leading ends of both of the ports in said main valve are so located that each of said passages will communicate with one of said main valve ports only after the piston in the cylinder communicating with that passage has moved inward a substantial distance from either of said dead center positions, and which includes means for reversing the movements of said pistons and means for connecting said auxiliary valve ports to opposite sides of said hydraulic circuit.

17. In a pump, the combination of a rotatable cylinder barrel having an axial chamber formed therein and an end head which extends radially inward beyond the wall of said chamber, a main valve seat arranged upon the outer end of said end head and having a plurality of main cylinder ports formed therein, an auxiliary valve seat arranged upon the portion of said end head which extends inward beyond the wall of said chamber, said auxiliary valve seat having formed therein a plurality of auxiliary cylinder ports equal in number to said main cylinder ports, a plurality of pistons and cylinders arranged in said cylinder barrel with each cylinder communicating with one of said main cylinder ports and with one of said auxiliary ports, a check valve arranged between each of said auxiliary ports and the cylinder communicating therewith, means responsive to rotation of said cylinder barrel for moving said pistons successively inward from a first dead center position and for permitting said pistons to move successively outward from a second dead center position, a main valve engaging said main valve seat and having a discharge port and an intake port with which each of said main cylinder ports communicates alternately during rotation of said cylinder barrel, means for connecting said discharge port and said intake port to the pressure and return sides respectively of a hydraulic circuit, an auxiliary valve engaging said auxiliary valve seat and having an auxiliary valve port with which said auxiliary cylinder ports communicte successively during rotation of said cylinder barrel, and means for connecting said auxiliary port to the pressure side of said circuit, said auxiliary valve port having the leading end thereof so located that each of said auxiliary cylinder ports will communicate therewith immediately after the piston in the cylinder communicating with that cylinder port starts to move inward from a dead center position and said discharge port having the leading end thereof so located that each of said main cylinder ports will communicate therewith only after the piston in the cylinder communicating with that cylinder port has moved inward a substantial distance from a dead center position.

18. A combination as set forth in claim 17 in which said auxiliary valve has two auxiliary valve ports, the leading ends of said auxiliary valve ports are so located that each of said auxiliary cylinder ports will communicate with one of said auxiliary valve ports immediately after the piston in the cylinder communicating with that cylinder port starts to move inward from either of said dead center positions and the leading ends of both of the ports in said main valve are so located that each of said main cylinder ports will communicate with one of said main valve ports only after the piston in the cylinder communicating with that valve port has moved inward a substantial distance from either of said dead center positions, and which includes means for reversing the movements of said pistons and means for connecting said auxiliary valve ports to opposite sides of said hydraulic circuit.

References Cited in the file of this patent

UNITED STATES PATENTS

| | | |
|---|---|---|
| 1,081,810 | Carey | Dec. 16, 1913 |
| 2,075,017 | Benedek | Mar. 30, 1937 |
| 2,288,768 | Zimmermann | July 7, 1942 |
| 2,501,165 | Ferris | Mar. 21, 1950 |
| 2,529,309 | Purcell | Nov. 7, 1950 |
| 2,553,655 | Herman et al. | May 22, 1951 |

FOREIGN PATENTS

| | | |
|---|---|---|
| 956,823 | France | 1949 |